United States Patent [19]
Doeff et al.

[11] Patent Number: 5,558,961
[45] Date of Patent: Sep. 24, 1996

[54] SECONDARY CELL WITH ORTHORHOMBIC ALKALI METAL/MANGANESE OXIDE PHASE ACTIVE CATHODE MATERIAL

[75] Inventors: Marca M. Doeff, Hayward; Marcus Y. Peng, Cupertino; Yanping Ma, Albany; Steven J. Visco, Berkeley; Lutgard C. DeJonghe, Lafayette, all of Calif.

[73] Assignee: Regents, University of California, Oakland, Calif.

[21] Appl. No.: 259,658

[22] Filed: Jun. 13, 1994

[51] Int. Cl.$^6$ .................................................. H01M 10/38
[52] U.S. Cl. ........................................ 429/224; 429/218
[58] Field of Search .................................. 429/224, 218, 429/191, 192

[56] References Cited

U.S. PATENT DOCUMENTS

| | | | |
|---|---|---|---|
| 5,108,855 | 4/1992 | Daifuku et al. | 429/191 |
| 5,240,794 | 8/1993 | Thackeray et al. | 429/224 |
| 5,252,413 | 10/1993 | Alamgir et al. | 429/191 |
| 5,279,910 | 1/1994 | Sasaki et al. | 429/213 |
| 5,286,582 | 2/1994 | Tahara et al. | 429/218 |
| 5,358,805 | 10/1994 | Fujimoto et al. | 429/224 |
| 5,370,949 | 12/1994 | Davidson et al. | 429/224 |

OTHER PUBLICATIONS

Gummow, Liles, and Thackery, "Lithium Extraction From Orthorhombic Lithium Manganese Oxide and the Phase Transformation to Spinel", Mat. Res. Bull., vol. 28, pp. 1249–1258 (No Month).

Doeff, Richardson, Kepley, "Lithium Insertion Processes of Orthorhombic NaxMnO2-Based Electrode Materials", LBLL-38069 UC-404 preprint.

Koetschau et al., "Orthorhombic LiMnO2 High Capacity Cathode for Li–Ion Cells", J. Electrochem Soc., vol. 142, pp. 2906–2910.

Doeff, Marca M., et al., "Solid Sodium Solid Polymer Electrolyte Batteries", *Proceedings of the 28th Intersociety Energy Conversion Engineering Conference*, vol. 1, 1993, pp. 1.1111–1.1116.

Ma, Yanping, et al., "Rechargeable Na/Na$_x$CoO$_2$ and Na$_{1.5}$Pb$_4$/Na$_x$CoO$_2$ Polymer Electrolyte Cells", *J. Electrochem. Soc.*, vol. 140, No. 10, Oct., 1993, pp. 2726–2733.

Macklin, W. J., et al., "Performance of Lithium–Manganese Oxide Spinel Electrodes in a Lithium Polymer Electrolyte Cell", *Journal of Power Sources*, vol. 34, 1991, pp. 39–49. (no month available).

Mandiboure, A., et al., "Electrochemical Intercalation and Deintercalation of Bronzes", *Journal of Solid State Chemistry*, vol. 57, 1985, pp. 323–331. (no month available).

Parant, Jean-Paul, et al., "Sur Quelques Novelles Phases de Formule Na$_x$MnO$_2$ (x $\leq$ 1)", *Journal of Solid State Chemistry*, vol. 3, 1971, pp. 1–11. (no month available).

(List continued on next page.)

Primary Examiner—Prince Willis, Jr.
Assistant Examiner—Carol Chaney
Attorney, Agent, or Firm—Paul R. Martin

[57] ABSTRACT

An alkali metal manganese oxide secondary cell is disclosed which can provide a high rate of discharge, good cycling capabilities, good stability of the cathode material, high specific energy (energy per unit of weight) and high energy density (energy per unit volume). The active material in the anode is an alkali metal and the active material in the cathode comprises an orthorhombic alkali metal manganese oxide which undergoes intercalation and deintercalation without a change in phase, resulting in a substantially linear change in voltage with change in the state of charge of the cell. The active material in the cathode is an orthorhombic structure having the formula M$_x$Z$_y$Mn$_{(1-y)}$O$_2$, where M is an alkali metal; Z is a metal capable of substituting for manganese in the orthorhombic structure such as iron, cobalt or titanium; x ranges from about 0.2 in the fully charged state to about 0.75 in the fully discharged state, and y ranges from 0 to 60 atomic %. Preferably, the cell is constructed with a solid electrolyte, but a liquid or gelatinous electrolyte may also be used in the cell.

31 Claims, 6 Drawing Sheets

OTHER PUBLICATIONS

Tarascon, J. M., et al., "Li Metal–Free Rechargeable Batteries Based on $Li_{1+x}Mn_2O_4$ Cathodes ($0 \leq x \leq 1$) and Carbon Anodes", *J. Electrochem. Soc.*, vol. 138, No. 10, Oct., 1991, pp. 2864–2868.

Thackeray, M. M., et al., "Spinel Electrodes from the Li–Mn–O System for Rechargeable Lithium Battery Applications", *J. Electrochem. Soc.*, vol. 139, No. 2, Feb., 1992, pp. 363–366.

Thackeray et al., Electro chim Acta, vol. 38, (1993) pp. 1259–1267 "Ramsdellite—$MnO_2$ for Lithium Batteries: The Ramsdellite to Spinel Transformation"(No month available).

Julien and Nazri, *Solid State Batteries: Materials Design and Optimization*, Kluwer Academic Publishers, pp. 487–490 (1994) (no month).

FIG. 1

◇ = (MnO₆)  △ = (MnO₅)  ○ = Na

SECONDARY CELL WITH ORTHORHOMBIC ALKALI METAL/MANGANESE OXIDE PHASE ACTIVE CATHODE MATERIAL

The invention described herein arose in the course of, or under, Contract No. DE-AC03-SF00098 between the United States Department of Energy and the University of California for the operation of the Lawrence Berkeley Laboratory. The Government may have rights to the invention.

BACKGROUND OF THE INVENTION

1. Field of the Invention

This invention relates to secondary cells. More particularly, this invention relates to a secondary cell wherein the active material in the cathode is an orthorhombic alkali metal/manganese oxide material.

2. Description of the Related Art

In the formation of secondary (rechargeable) cells, it is important that the cell have a high rate of discharge, good cycling capabilities, good stability of the cathode material, high specific energy (energy per unit of weight) and high energy density (energy per unit volume). Cost of the materials used in the cell is also an important consideration. Manganese oxide is widely used in commercial alkaline batteries and primary lithium cells, in part due to its low cost, and widespread availability and has, therefore, been considered for use as active material in secondary cells. Macklin et al., in an article entitled "Performance of Lithium-Manganese Oxide spinel Electrodes in a Lithium Polymer Electrolyte Cell", published in the Journal of Power Sources 34 (1991) at pp 39–49, suggested the use of lithiated manganese oxides in spinel form, $LiMn_2O_4$ for use in secondary lithium or lithium ion cells with solid polymer electrolytes with varying degrees of success.

Thackeray et al. in "Spinel Electrodes from the Li-Mn-O System for Rechargeable Lithium Battery Applications", published in the Journal of the Electrochemical Society, Vol. 139, No. 2 (1992) at pp 363–366, discloses the use of lithium manganese oxide spinels and defect spinels in lithium cells with liquid electrolytes. Tamscon et al., in "Li Metal-Free Rechargeable Batteries Based on $Li_{1+x}Mn_2O_4$ cathodes ($0 \leq x \leq 1$) and Carbon Anodes", published in the Journal of the Electrochemical Society, Vol. 138, No. 10 (1991) at pp 2864–2868, discloses a lithium manganese oxide spinel in a lithium ion cell, i.e. a cell with a carbon anode.

Ma et al., in an article entitled "Rechargeable $Na/Na_xCoO_2$ and $Na_{1.5}Pb_4/Na_xCoO_2$ Polymer Electrolyte Cells", which was published in the Journal of the Electrochemical Society 140 (October 1993), at pp 2726–2733, showed a $Na/PEO/Na_xCoO_2$ cell with performance comparable to many lithium polymer systems in terms of energy density, power density, rate capability, and cyclability.

While the use of manganese oxide-based active cathodic material is of interest, and has been explored by others, manganese oxides have several unusual (and undesirable) characteristics relevant to their use as active material in cathodes of secondary cells. Among these characteristics is the existence of a large number of phases, and a strong tendency for reduction either to manganese (II), or to $Mn_2O_3$ with concomitant formation of sodium oxide (in sodium cells) or lithium oxide (in lithium cells) occurring. Such reactions are not completely reversible, and therefore are undesirable for rechargeable cells. Thus, for example, $\gamma$-$MnO_2$ tends to undergo irreversible reduction and is useful only in primary cells.

Reversible reductive intercalation of alkali metal ions and concurrent reduction of Mn (IV) centers to Mn (III) occurs more readily in those structures with large vacant sites that can accommodate ions. Thus, spinel-type $LiMn_2O_4$ is thought to be more reversible in lithium cells because of its structure. However, reduction to Mn(III) is associated with a Jahn-Teller distortion of the $MnO_6$ octahedra that forms most manganese (IV) structures; this often leads to phase changes at ambient temperatures, and causes the electronic localization that is responsible for the rather poor electronic and ionic conductivity of these materials; the flat discharge profile typical of Li/spinel $LiMn_2O_4$ cells is evidence of such a phase change. The tendency for facile structural changes also decreases the reversibility of the manganese (IV) oxide cathode.

The synthesis and characterization of a number of different $Na_xMnO_2$ compounds or phases ($Na_{0.40}MnO_2$, $Na_{0.44}MnO_2$, $Na_{0.70}MnO_2$, and $NaMnO_2$) is described by Parant et at. in an article entitled "Sur Quelques Nouvelles Phases de Formule $Na_xMnO_2$ ($x \leq 1$)", published in the Journal of Solid State Chemistry 3 (1971) at pages 1–11.

Mendibourne et at., in an article entitled "Electrochemical Intercalation and Deintercalation of $Na_xMnO_2$ Bronzes", published in the Journal of Solid State Chemistry 57, (1985) at pages 323–331, describe intercalation and deintercalation studies on a number of $Na_xMnO_2$ compounds, although they state, with respect to $Na_{0.44}MnO_2$, that the occurrence of two types of manganese sites (octahedral and rectangular pyramidal) could make a hopping mechanism difficult and thereby decrease the electronic conductivity, and as a consequence, intercalation was not tested in this material.

Despite the discouraging attributes of many of the alkali metal manganese oxide compounds, it would be desirable to form a secondary alkali metal cell, using manganese oxide, in view of the low cost and availability of manganese oxide.

SUMMARY OF THE INVENTION

Quite surprisingly, we have discovered an alkali metal manganese oxide secondary cell which can provide a high rate of discharge, good cycling capabilities, good stability of the cathode material, high specific energy (energy per unit of weight) and high energy density (energy per unit volume). The active material in the anode is an alkali metal and the active material in the cathode comprises an alkali metal manganese oxide having an orthorhombic form which undergoes intercalation and deintercalation without a change in phase, resulting in a substantially linear change in voltage with change in the state of charge of the cell. The active material in the cathode is an orthorhombic structure having the formula $M_xZ_yMn_{(1-y)}O_2$, where M is an alkali metal; Z is a metal capable of substituting for manganese in the orthorhombic structure such as iron, cobalt or titanium; x ranges from 0.2 to 0.75, depending upon the state of charge of the cathode; and y ranges from 0 to 60 atomic %. Preferably, the cell is constructed with a solid electrolyte, but a liquid or gelatinous electrolyte may also be used in the cell.

DETAILED DESCRIPTION OF THE INVENTION

The invention comprises an alkali metal manganese oxide secondary cell which can provide a high rate of discharge, good cycling capabilities, good stability of the cathode material, high specific energy (energy per unit of weight) and high energy density (energy per unit volume). The active material in the anode is an alkali metal and the active material in the cathode comprises an alkali metal manganese oxide having an orthorhombic form which undergoes intercalation and deintercalation without a change in phase, resulting in a substantially linear change in voltage with change in the state of charge of the cell.

Figure 2:
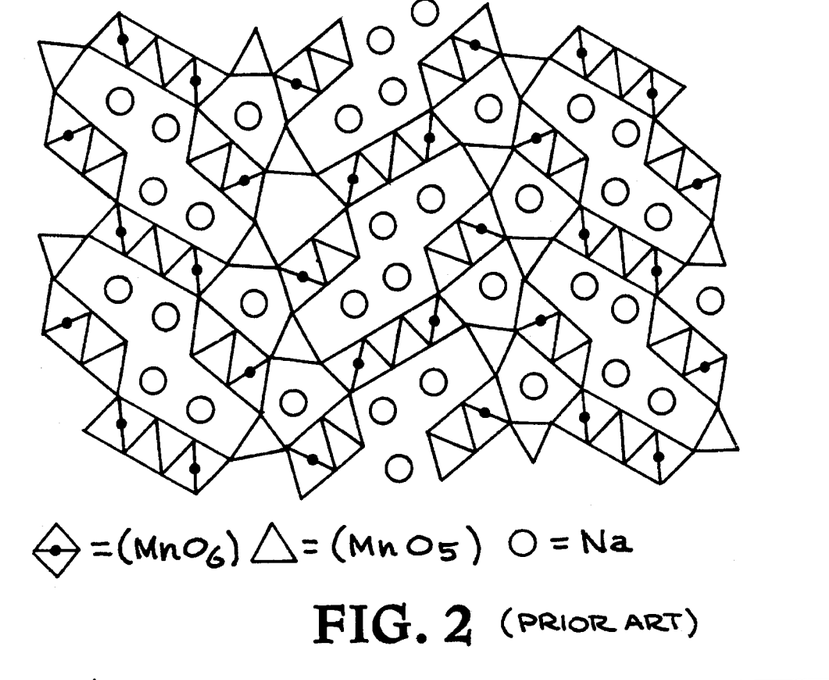
FIG. 2 is a structural representation of the orthorhombic structure of the active material in the cathode.

The active material in the cathode is an orthorhombic structure having the formula $M_xZ_yMn_{(1-y)}O_2$, where M is an alkali metal; Z is a metal such as iron, cobalt or titanium capable of substituting for the manganese in the orthorhombic structure; x varies from about 0.2, in the fully charged state, to about 0.75 in the fully discharged state; and y ranges from 0 to 60 atomic % (representing the substitution of up to 5 out of 9 of the manganese atoms in the unit cell with another metal). Preferably, the cell is constructed with a solid electrolyte, but a liquid or gelatinous electrolyte may also be used in the cell. The orthorhombic active cathode material is sometimes referred to as $Na_{0.44}MnO_2$, representing the stoichiometry of the orthorhombic material when formed (prior to any charge or discharge) by reaction of a sodium compound with a manganese compound in the presence of a source of oxygen at 750° C. or higher. The proposed disposition of the sodium atoms in the orthorhombic sodium manganese oxide active cathode material is generally illustrated in FIG. 2, although it is not the intent to be bound by any particular theory of the positioning of the sodium atoms in the structure.

By use of the term "high rate of discharge", is meant a rate of discharge of at least 50 µAmps/cm$^2$. By use of the term "good cycling capabilities" is meant at least 60 cycles at a discharge rate of at least 0.1 milliAmps/cm$^2$ (100 µAmps/cm$^2$) when the cell is discharged to at least 40% depth of capacity. By use of the term "good stability of the cathode material" is meant that there is no discernible phase change in the active cathode material after 60 cycles. By use of the term "high specific energy" (energy per unit of weight) is meant a theoretical specific energy of at least about 440 watt hours/kilogram. By use of the term "high energy density" (energy per unit volume) is meant a theoretical energy of at least about 1450 watt hours/liter.

Figure 1:
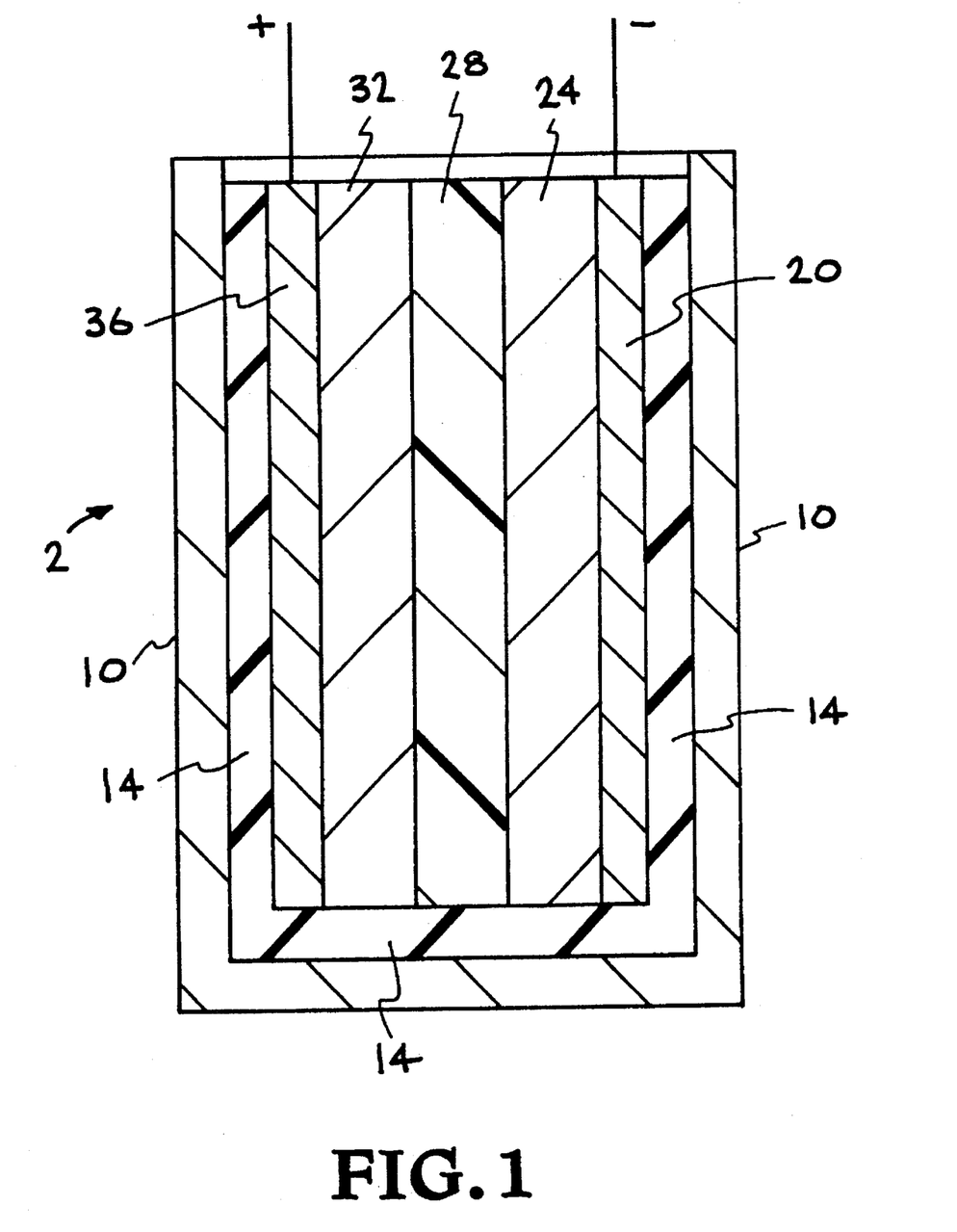
FIG. 1 is a vertical cross-sectional view of the secondary cell of the invention.

Referring now to FIG. 1, a secondary cell of the invention is generally illustrated at 2 comprising a casing 10, which may comprise an insulating material or a metal such as, for example stainless steel. When casing 10 is metal, it may also comprise the current collector electrode for either the cathode or the anode of the cell. Within casing 10 is an optional insulating liner 14 to electrically isolate casing 10 from the cell when casing 10 is a metal. An anode current collector 20 within cell 2 may comprise any metal which will be relatively inert to the chemicals used within cell 2, such as, for example, stainless steel, nickel, or aluminum. Next to, and in electrical communication with, anode current collector 20 is an alkali metal anode 24, which is separated from composite cathode 32 by a separator 28. Composite cathode 32, in the illustrated embodiment, may contain a solid electrolyte or binder as well as the active alkali manganese oxide cathodic material. A cathode current collector 36 positioned next to the composite cathode, and in electrical contact therewith, completes the rechargeable cell of the invention.

a. The Active Cathode Material

The active cathode material comprises an orthorhombic alkali metal manganese oxide material having, in its simplest form, the formula (when initially formed) $M_{0.44}MnO_2$, where M is an alkali metal which will usually be selected from the group consisting of lithium, sodium, potassium, and mixtures of same. The amount of the alkali metal in the active cathode material will change as the state of charge changes, with the alkali metal content ranging from about 0.2 when fully charged, to about 0.75 when fully discharged. Thus, the material may be referred to as having the formula $M_{0.44}MnO_2$, indicative of its stoichiometric state when initially formed, or an orthorhombic $M_xMnO_2$, material, wherein the value x will vary from 0.2 to 0.75, depending upon the state of charge of the orthorhombic $M_{0.44}MnO_2$ material, or whether it has undergone further chemical treatment without change in crystal structure. Generally the orthorhombic alkali manganese oxide active cathode material of the cell of the invention is referred to either by the formula $M_{0.44}MnO_2$, or by the formula $M_xMnO_2$, where x ranges from about 0.2, when fully charged to about 0.75 when fully discharged, to distinguish it from other alkali metal manganese oxide materials or phases such as $M_{0.40}MnO_2$, which has an entirely different crystal structure and which must be avoided, as will be discussed below. It will, therefore, be understood that reference to the active cathode material of the cell of the invention as $M_{0.44}MnO_2$ refers to the stoichiometric state of the active cathode material when it is first formed, i.e., before any charging or discharging of the material in a secondary cell or subsequent chemical treatment.

The manganese in the above formula $M_{0.44}MnO_2$, may be partially substituted for, in an amount up to 60 atomic %, by any other metal capable of substituting for manganese in the orthorhombic crystal structure which characterizes this alkali metal manganese oxide phase. Such substitution or doping may be advantageous in increasing the cycling characteristics of the active cathode material. i.e., enabling a cell constructed using the orthorhombic active cathode material to still maintain a good discharge rate after repeated cycling, as well as providing discharge characteristics less dependent on discharge rate.

Examples of metals which may be substituted, in part, for manganese in the formation of the orthorhombic alkali metal manganese oxide active cathode material include Group IVB metals such as titanium, zirconium, and hafnium, Group VB metals such as vanadium, niobium, and tantalum, Group VIB metals such as chromium, molybdenum, and tungsten, Group VIIB metals such as technetium and rhenium, and Group VIII metals such as iron, cobalt, nickel or any of the six platinum metals (ruthenium, rhodium, palladium, osmium, iridium, and platinum). Especially preferred of these metals are iron, cobalt, and titanium. Since these metals will substitute for manganese in the same orthorhombic crystal structure, they may be thought of as doping materials for the orthorhombic alkali manganese oxide active cathodic material used in the cell of the invention.

In view of such possible partial substitution for manganese in the above formula, the formula for the orthorhombic alkali metal manganese active material in the cathode of the cell of the invention may be written, in its broadest form, as $M_xZ_yMn_{(1-y)}O_2$, where M is lithium, sodium, potassium, and mixtures of same; x ranges from about 0.2, representing the fully charged state, to about 0.75, representing the fully discharged state; Z is a metal capable of substituting for manganese in the orthorhombic $M_{0.44}MnO_2$ phase structure; and y ranges from 0 to 60 atomic %.

Since it is important to the practice of the invention that the orthorhombic form or phase of the alkali metal manganese oxide active material be utilized in the cathode of the cell of the invention, it is important that other phases be excluded. This can usually be provided for during the formation of the orthorhombic alkali metal manganese oxide active material both by using proper stoichiometry in the reaction materials used in forming the orthorhombic alkali metal manganese phase, and by carefully controlling the minimum temperature during the reaction to maintain a minimum of at least 750° C.

In a first method of forming the orthorhombic alkali metal manganese oxide active material (which will be illustrated using only manganese, without any dopant metal), the desired phase may be formed by mixing powders of a sodium compound and a manganese compound (or a sodium manganese compound and a manganese compound) in a proper stoichiometric ratio (0.44 moles of alkali metal per mole of manganese). It should be noted that in referring to the above materials as sodium and manganese compounds, it is intended to include oxides as well as salts. Examples of such sodium and manganese compounds include sodium carbonate, sodium bicarbonate, sodium oxide, sodium peroxide, sodium nitrate, sodium permanganate, manganese oxides such as $Mn_2O_3$ and $Mn_3O_4$, and manganese nitrate. Examples of stoichiometric amounts used in the formation of the orthorhombic sodium manganese oxide phase are illustrated in the equations below:

$$0.22\ Na_2CO_3 + 0.5\ Mn_2O_3 \rightarrow Na_{0.44}MnO_2 + n\ O_2\uparrow + n\ CO_2\uparrow \quad (1)$$

$$0.44\ NaMnO_4 \cdot H_2O + 0.28\ Mn_2O_3 \rightarrow Na_{0.44}MnO_2 + 1.04\ O_2\uparrow \quad (2)$$

The powder mixture is then heated in the presence of air or oxygen to a temperature of at least 750° C., preferably at least about 800° C., and maintained at this temperature for at least about 4 hours (to ensure conversion of all of the salts). While a number of sodium salts and manganese salts may be utilized in such a reaction, care must be taken in the selection of the salts to ensure that byproducts (e.g., the anions of the salts) either volatilize off or are materials easily separable from the orthorhombic sodium manganese oxide product. It is also important that the reaction temperature be maintained at 750° C. or higher, since the undesired $M_{0.40}MnO_2$ phase will form at lower temperatures.

The orthorhombic sodium manganese oxide phase may also be formed by an aqueous method using nitrate salts of sodium and manganese, in proper stoichiometric ratios, in an aqueous solution. It should be noted that nitrate salts of lithium or potassium cannot be substituted for the nitrate; salts of sodium, since the desired orthorhombic crystal structure will not form using either lithium or potassium salts. To the aqueous solution is then added an amino acid such as glycine in a molar amount equal to or in excess of the sum of the moles of nitrate in both the sodium and manganese salts to complex the nitrates. It should be noted that the amount of amino acid used, such as glycine, is ideally at least: equal to the sum of the moles of the nitrates in order to maintain a high enough combustion temperature, since the amino acid/nitrate complex serves as a fuel for the reaction. The liquid is boiled off and the residue is ignited, resulting in a temperature in excess of 750° C., thereby forming the desired orthorhombic sodium manganese oxide phase in an exothermic reaction. Preferably, however, to ensure that the desired orthorhombic phase is formed, the resulting powder is further calcined at about 800° C. for about 4 hours. The reaction equation for this method, in proper stoichiometry, is illustrated as follows:

$$0.44\ NaNO_3 + Mn(NO_3)_2 + 1.44\ H_2NCH_2COOH \rightarrow Na_{0.44}MnO_2 + 8.2\ O_2\uparrow \quad (3)$$

The orthorhombic $Na_xMnO_2$ may be used in cells in the as-prepared form, with nominal composition $Na_{0.44}MnO_2$, or may be further chemically treated prior to use, to produce the fully oxidized, fully reduced, or ion-exchanged forms. For some applications, the chemically treated materials may be preferably; e.g., the lithium ion exchanged or fully oxidized form for lithium cells, or the fully reduced form for cells with carbon anodes. In all cases, the chemical treatment should not be so severe that the orthorhombic structure, such as illustrated in FIG. 2, is disrupted. Methods for chemical exchange, oxidation, and reduction are discussed below.

In the chemical treatment of the orthorhombic $Na_xMnO_2$ by ion exchange (without disrupting the orthorhombic structure), lithium ions may be exchanged for sodium ions, for example, by stirring $Na_xMnO_2$ powders in a solution of an appropriate lithium salt at moderate temperatures, i.e., ranging from about room temperature (~20° C.) up to the boiling point of the solvent for at least one hour and preferably about twelve hours. Any stable lithium salt soluble in water or an organic solvent may be used, such as lithium trifluoromethane sulfonate, lithium bis (trifluoromethanesulfonate) imide, lithium chloride, lithium fluoride, or lithium perchlorate. Any solvent which dissolves the lithium salt may be used, such as water, acetone, or acetonitrile. The concentration of the lithium salt should be chosen so that there is either a stoichiometric balance or an excess present. If too little salt is used, exchange will not be complete. The resultant product is then filtered, washed, and dried thoroughly and will have a nominal composition of $Na_{0.2}Li_{0.22}MnO_2$. The drying may be either carried out in vacuum at temperatures below about 100° C., or in air above about 100° C., but below about 250° C. to prevent conversion to unwanted phases. Alteratively, exchange may be carried out by mixing the powder in a molten salt (e.g., molten lithium nitrate). Positive evidence of the exchange may be obtained by elemental analysis and x-ray diffraction.

The $Na_{0.44}MnO_2$ may be oxidized to the fully charged state, having a nominal composition of $Na_{0.2}MnO_2$, (without disrupting the orthorhombic structure) by treatment with aqueous acid. The $Na_xMnO_2$ powder may be stirred in aqueous acid at room temperature for several hours, preferably twelve or more. Aqueous solutions of approximately 10 volume % of mineral acids such as hydrochloric, sulfuric, or nitric may be used. The powder may then be filtered, washed, and well-dried under vacuum, or by heating in air below 400° C. for less than twelve hours. Overly vigorous heating may result in decomposition of the product back to the starting material $Na_{0.44}MnO_2$, and $Mn_2O_3$. The chemical oxidation to $Na_{0.2}MnO_2$ may be confirmed through elemental analysis and x-ray diffraction, with the peaks in the x-ray diffraction pattern showing a characteristic shift. This method of chemical treatment also has the advantage that the aqueous acid also dissolves away any unwanted $Mn_2O_3$ byproduct.

The $Na_{0.44}MnO_2$ may be reduced (again without disrupting the orthorhombic structure) by treatment with an appropriate alkali metal ion-containing reducing agent such as lithium iodide, n-butyl lithium, or sodium dithionite ($Na_2S_2O_4$). The method for doing this will be dependent upon the state of charge of the starting material (e.g., whether $Na_{0.44}MnO_2$ or the ion-exchanged form, or the oxidized form is used), the reducing agent, and the degree of reduction desired. In general, the reducing agent will be dissolved in an appropriate solvent under an inert atmosphere, the $Na_xMnO_2$ powder added, and the solution refluxed for several hours until the desired degree of reduction is complete. The reduced powders should be filtered, washed, and dried thoroughly. Again, care should be taken not to heat the powders too vigorously, i.e., the temperature should be maintained below about 250° C. when using a lithium-containing reducing agent and below about 400° C. when using a sodium-containing reducing agent. The degree of reduction may be determined by elemental analysis and x-ray diffraction.

It should be noted that the accuracy of the stoichiometry of the starting materials is preferably about 10 molar % or better. If there is a slight stoichiometric excess of manganese over sodium, but not exceeding about 10 molar %, the formation of the desired orthorhombic structure will not be affected, with the excess manganese simply forming $Mn_2O_3$, which is easily removed from the product by treating it with acid, as described above. If the stoichiometry varies by more than about 10 molar %, e.g., resulting in an excess of sodium, the $Na_{0.70}MnO_2$ phase may form, or other layered structures, which are undesirable. If a large excess of manganese is present, this may result in the formation of undesirable phases $Na_{0.2}MnO_2$ and $Na_{0.4}MnO_2$ which will decompose to the desired orthorhombic phase ($Na_{0.44}MnO_2$) and $Mn_2O_3$ above 800° C.

It is also important that the calcining temperature be at least 750° C., and preferably at least about 800° C., to avoid formation of the $Na_{0.40}MnO_2$ phase, or to convert any $Na_{0.40}MnO_2$ phase present to the desired $Na_{0.44}MnO_2$ phase. It is important that such $M_{0.40}MnO_2$ phase material be excluded from the orthorhombic $M_{0.44}MnO_2$ active material because it has a different phase structure which shows poor charge capacity compared with the orthorhombic $Na_{0.44}MnO_2$ phase. Formation of the orthorhombic sodium manganese oxide phase, by either of the above-described methods, may be subsequently verified by x-ray diffraction.

Doped orthorhombic sodium manganese oxide compounds may be formed instead of the undoped product, in either of the above processes, by substituting the dopant metal, usually in the form of an oxide, for the manganese, while still maintaining the same stoichiometric proportions. Examples of such stoichiometry for starting material are given for iron and titanium in the equations below:

$$0.44\ NaMnO_4 \cdot H_2O + 0.27\ Mn_2O_3 + 0.0067\ Fe_3O_4 \longrightarrow \tag{4}$$

$$0.367\ NaMnO_4 \cdot H_2O + 0.037\ NaTi_2O_7 + 0.261\ Mn_2O_3 \longrightarrow \tag{5}$$

b. The Composite Cathode with Solid Electrolyte

In a preferred embodiment of the, invention, the secondary cell of the invention is formed with a solid electrolyte by forming a composite cathode which contains both the active cathode material and the solid electrolyte. Such a composite cathode will comprise the following materials:

1. Active cathode material
2. Carbon (optional)
3. solid electrolyte
4. Dispersant (optional)

The amounts of the above material:s, in percent by weight based on the total weight of all of the components of the composite cathode, comprise from about 20 wt. % to about 70 wt. % active cathode material, preferably from about 30 wt. % to about 60 wt. %, and optimally from about 30 wt. % to about 45 wt. %. If too low a percentage of active cathode material is used, the capacity of the cell would be too low (from either a volume % or weight % standpoint), while too high a percentage will not permit the use of sufficient solid electrolyte in the composite.

The amount of the carbon component, indicated as optional, and which is added to increase the conductivity of the composite cathode, may range from 0 to 25 wt. %, and preferably will range from about 5 wt. % to about 15 wt. %, and typically will be about 10 wt. %. The dispersant, also indicated as optional, is added to prevent clumping of the insoluble portions of the composite cathode, i.e., the active material and carbon (if present), when the powered mixture is put into a solvent to dissolve the polymer and alkali metal salt portions of the solid electrolyte. The amount of optional dispersant added to the composite cathode mixture will range from 0 to about 7 wt. %, and preferably from about 2 wt. % to about 5 wt. %. Any typical dispersant, such as a polyoxyethylene derivative, e.g., Brij-35, or a quaternary ammonium non-ionic detergent such as Triton X-100, may be used.

The amount of solid electrolyte will range from a minimum of about 25% by weight up to maximum of about 60 wt. %, although amounts as high as 80 wt. %, implying low levels of active material in the cathode and thus low energy density, could be used. The solid electrolyte comprises a combination of an ionically conductive polymeric material, a conductive alkali metal salt, and an optional plasticizer. The ionically conductive polymer may comprise, for example, a polymeric material, particularly polyethers such as polyethylene oxide (PEO), polypropylene oxide (PPO), copolymers of the above polymers, and amorphous polyethylene oxide such as oxymethylene-linked polyethylene oxide.

The conductive alkali metal salts comprise conductive, yet stable, salts such as, for example, sodium perchlorate or lithium perchlorate, sodium trifluoromethane sulfonate (triflate), and sodium bistrifluoromethane sulfonate imide (TFSI). The ratio of alkali metal salt to polymer in the solid electrolyte, when the polymer comprises polymerized monomers of ethylene oxide and/or propylene oxide, ranges from 8 to 100 monomer units per equivalent of salt, e.g., $P(EO)_8MX$ to $P(EO)_{100}MX$ where EO is one monomeric unit of ethylene oxide and M is an alkali metal, usually lithium, sodium, or potassium, and X is the anion of the MX salt. The optimum would be about $P(EO)_8MX$ for lithium and about $P(EO)_{20}MX$ for sodium. Thus, eight ethylene oxide monomeric units per MX is denoted as $P(EO)_8MX$, and eight propylene oxide monomeric units per MX is denoted as $P(PO)_8MX$. For other polymers, concentrations may range from about 0.1 to about 3.5 moles of alkali metal salt per liter of solution, e.g., with a solvent such as propylene carbonate, or mixed solvents such as ethylene carbonate/dimethyl carbonate, with 1 mole/liter concentration optimum.

The optional plasticizer may be added to increase the conductivity, when it is desirous to form a more gelatinous electrolyte, for example, using other polymeric materials such as polyacrylonitrile (PAN) to which propylene carbonate, or mixed solvents such as ethylene carbonate/dimethyl carbonate, may be added as a plasticizer. When a plasticizer is used, the amount may vary from 0 to as much as 95%, by total weight of the solid electrolyte, and preferably from 0 to 60 wt. %. Plasticizers used in the cell must be non-reactive with the anode and cathode materials and should be miscible with the salts they are used with, i.e., not cause the salts to precipitate out. Examples of useful plasticizers include: propylene carbonate, dimethoxyethane, diglyme, triglyme, tetraglyme, polyethylene glycol (PEG), polyethylene glycol dimethyl ether, and dimethylcarbonate, or mixtures of any combination of these or other suitable solvents.

The composite cathode is formed by mixing together the orthorhombic active cathode material, the conducting polymer and alkali metal salt comprising the solid electrolyte, the carbon (if present), and dispersant (if present), and adding the powder mixture to a solvent capable of dissolving the conductive polymer and the alkali metal salt. Usually the solvent will comprise an organic solvent such as, for example, acetonitrile, isopropyl alcohol, or dimethoxyethane ether. The dispersant functions to prevent or inhibit clumping together of the non-soluble portions of the mixture (the orthorhombic active cathode material and the carbon). The resulting slurry is then cast or "slipped" onto an inert support material, e.g., such as, for example, a Teflon-coated substrate, a glass substrate, or onto a metal current collector, and then air dried to drive off the solvent. The dried material may then be further dried either in a vacuum oven or air dried with heat at about 150° C. for a period of at least about 4 hours. The composite cathode material (and support) may then be removed from the glass or Teflon-coated substrate, and cut up to the desired size for formation of the cell of the invention. The thickness of the cathode material is governed by the desired capacity and the conductivity of the electrolyte within the cathode. The thickness of the composite cathode, material should range from about 10 μm to about 200 μm, with the optimum thickness being about 50 μm for composite cathodes with no plasticizers, and over 50 μm when a plasticizer is present.

c. The Cathode with Liquid Electrolyte

While it is preferred that the secondary cell of the invention be constructed with a solid electrolyte incorporated into a composite cathode, the orthorhombic active cathode material may be used in connection with a liquid electrolyte, in which case the cathode is formed using as much as 95 wt. % of the orthorhombic active cathode material, preferably about 80 wt. % plus an optional 0 to 15 wt. % carbon, nominally about 7 wt.%, with the remainder comprising a binder material such as polytetrafluoroethylene (Teflon) powder or ethylenepropylene diene monomer (EPDM). The electrolyte then will comprise an alkali metal salt, such as those described above with respect to the solid electrolyte in the composite cathode, dissolved in a solvent system such as an organic solvent or mixture of organic solvents, e.g., propylene carbonate, dimethoxyethane, butyrolactone, or diglyme, or mixtures thereof, in a concentration of about 0.5 molar to about 2 molar, preferably about 1 molar.

d. The Separator

The separator may comprise any ionically conductive solid insulation material, but preferably comprises an ionically conductive solid polymeric material. In the preferred embodiment, the separator comprises a mixture of an ionically conductive polymeric material, such as, for example, polyethers such as polyethylene oxide (PEO), polypropylene oxide (PPO), copolymers of the above polymers, or amorphous polyethylene oxide such as oxymethylene-linked polyethylene oxides; and a stable, conductive alkali metal salt such as sodium perchlorate or lithium perchlorate, sodium (or lithium) trifluoromethane sulfonate (triflate), and sodium (or lithium) bistrifluoromethane sulfonate imide (TFSI). The ratio of alkali metal salt to polymer in the solid separator is the same as the above-described ratio of alkali metal to polymer in the solid electrolyte.

The solid separator is formed by mixing together the conducting polymer and the alkali metal salt and adding the powder mixture to a solvent capable of dissolving the conductive polymer and the alkali metal salt, e.g., an organic solvent such as acetonitrile, isopropyl alcohol, or dimethoxyethane ether. The resulting slurry is then cast or "slipped" onto an inert support material, e.g., such as, for example, a Teflon-coated substrate, and then air dried to drive off the solvent. The dried material may then be further dried either in a vacuum oven or air dried with heat up to about 150° C., preferably about 110° C., for a period of at least about 4 hours. The solid separator material (and support) may then be cut up to the desired size for formation of the cell of the invention. The separator may range in thickness from about 10 μm to about 100 μm, and preferably from about 20 μm to about 50 μm. The lower limit is determined by the ability to make separators with good integrity (no pin holes), and the upper limit by the ionic conductivity of the electrolyte.

e. The Anode

The anode of the cell may comprise an alkali metal such as lithium, sodium, or potassium; an alloy containing an alkali metal; or a carbonaceous material. By "an alloy containing an alkali metal" is meant an alloy of an alkali metal with another metal wherein the alkali metal comprises over 20 weight % of the alloy. In some instances the other metal may also comprise an alkali metal, e.g. a sodium-potassium alloy. Examples of lithium-containing alloys include lithium-aluminum and lithium-silicon. Examples of sodium-containing alloys include sodium-lead, sodium-gold, and sodium-silver. Sodium-potassium and sodium-mercury alloys can also be used. However these last two alloys are very reactive and are liquid at room temperature.

The carbonaceous material which may be used for the anode of the cell may comprise a solid carbon anode or a carbon composite such as, for example, carbon mixed with a conductive polymer such as polyethylene oxide (PEO), and a conducting salt such as sodium trifluoromethane sulfonate (triflate) and then molded into the desired anode shape. When carbon is used as the anode, the orthorhombic $Na_xMnO_2$ must be present in the cathode in the partially discharged (as made) or fully discharged (e.g., reduced with LiI, n-butyl lithium, or sodium dithionite) state. Starting the cell using acid-leached material (i.e., the cathode material in a fully oxidized state) will not work well with a carbon anode, unless the carbon is pretreated with alkali metal-containing reducing agents, e.g., a lithiated carbon anode.

f. The Current Collectors

The cell is advantageously provided with current collectors which comprise metal sheets in electrical contact, respectively, with the anode and cathode, to facilitate homogeneous electrical connection between the cell terminals and the entire respective areas of one side of the cathode and anode. The current collectors may comprise any metal which will be non-reactive with the materials present in the secondary cell of the invention. Stainless steel, nickel, aluminum, gold, silver, or any of the platinum metals are examples of metals capable of serving as one or both of the current collectors. Preferably, from a standpoint of both economics and non-reactivity, the current collectors will comprise a stainless steel material or aluminum.

The following examples will serve to further illustrate the invention.

EXAMPLE I

Several rechargeable cells were constructed using a sodium anode; a polyethylene oxide/sodium triflate separator; and a composite orthorhombic $Na_{0.44}MnO_2$ cathode comprising the active cathode material, carbon, a solid electrolyte comprising polyethylene oxide and sodium triflate, and a dispersant. The sodium anode was formed by first purifying the sodium by heating it to 200° C. to melt it, then filtering it through stainless steel wool, and then heating it to 400° C. with titanium sponge, which was then mechanically removed. The purified sodium was then placed between polyethylene sheets and rolled out to form sodium foil anodes having a thickness of 250 μm.

The separator was formed by dissolving 3 grams of polyethylene oxide (PEO) and 1.46 grams of sodium trifluoromethane sulfonate (sodium triflate) in 180 ml. of acrylonitrile solvent, forming a solution having a molar ratio of PEO (monomer) to sodium triflate of 8:1. Free standing films of the solution was cast onto Teflon substrates and allowed to dry, forming a separator having an average thickness of about 30 μm.

The composite cathode containing the solid electrolyte was formed by first forming the orthorhombic alkali metal manganese oxide active cathode material. The active cathode material was formed by heating a powder mixture of 1.19 grams of $Na_2CO_3$ and 4.03 grams of $Mn_2O_3$ under air to a temperature of about 800° C. for 12 hours to form the orthorhombic $Na_{0.44}MnO_2$ phase, and then grinding the resultant solid reaction product to a powder having an average particle size of about 1 μm. To 0.77 grams of this orthorhombic $Na_{0.44}MnO_2$ phase reaction product was added 1 gram of PEO, 0.49 grams of sodium triflate, 0.26 grams of carbon, and 0.05 grams of a polyoxyethylene derivative-type dispersant available under the trademark Brij 35. The resulting powder mixture was added to 60 ml. of acetonitrile solvent and stirred until well mixed. The slurry was then cast on a Teflon-coated substrate as a 50 μm thick coating, allowed to air dry, and then further heated under vacuum to 60° C. for 24 hours.

The sodium foil anodes, separators, and composite cathodes were then cut into 3 cm² disks and assembled between two stainless steel current collectors, with one side of the sodium foil anode against one surface of one of the current collectors and one surface of the composite cathode against one surface of the other current collector and the separator placed between the sodium anode and the composite cathode to form test cells. A second set of cells was identically formed, except that after forming the orthorhombic $Na_{0.44}MnO_2$ active cathode material, and before assembling the composite cathode, the active cathode materials was treated with aqueous 10% hydrochloric acid to remove any excess $Mn_2O_3$ as well as to remove the sodium from the orthorhombic structure.

Several cells from each of the two sets of cells were fully discharged, and then fully charged. With the cells maintained at a temperature of 85° C., the open circuit voltages of each cell at full charge was measured, after allowing the cells to rest for four hours. Each cell was then discharged, at a rate of about 50 μAmp/cm², until about 5% of the theoretical capacity had been discharged. The cells were again allowed to rest for four hours, followed by an open circuit measurement of the voltage. This was repeated for each cell until the cells had been completely discharged. The open cell voltage measurements for the cells is plotted in FIG. 3 as a function of the capacity, as expressed in amount of sodium in the orthorhombic $Na_xMnO_2$ structure, with x=0.2 representing full charge, and x=0.75 representing full discharge. It will be seen that the drop in voltage is linear, with discharge of the cells, indicating that there is no phase change in the orthorhombic sodium manganese oxide active cathode material from complete charge to complete discharge. The graph of FIG. 3 also indicates that there is no difference in performance between the cells in which the active orthorhombic sodium manganese oxide material in the cathode is in the as made state (where x=0.44) and the material leached with acid wherein, in the fully charged state, x=0.2.

Figure 3:
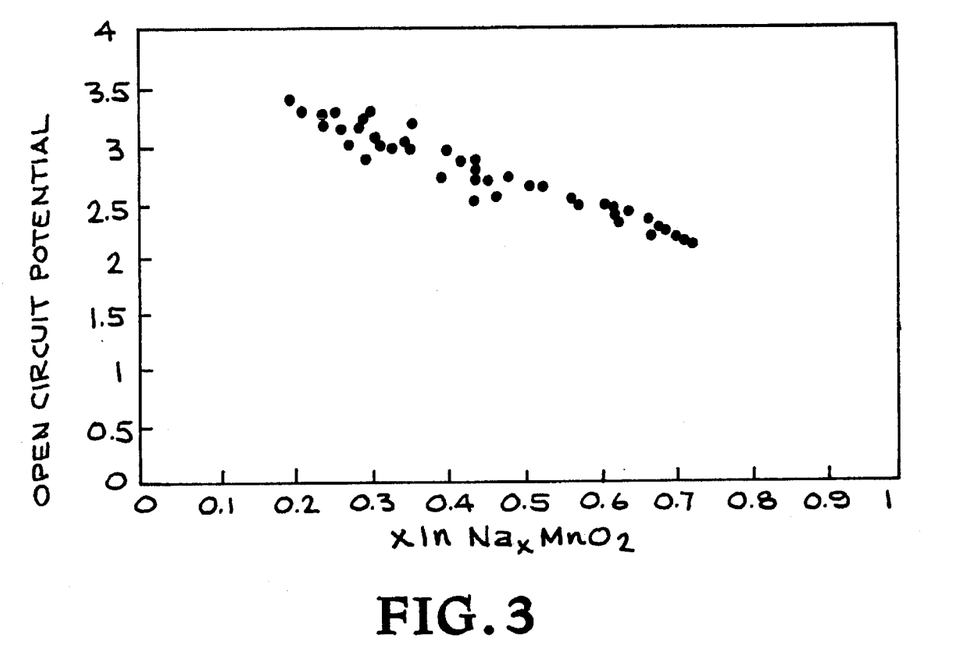
FIG. 3 is a graph showing the linear change in open circuit voltages plotted against sodium content for a secondary cell with an orthorhombic sodium manganese oxide active cathode material and a sodium anode.
Figure 4:
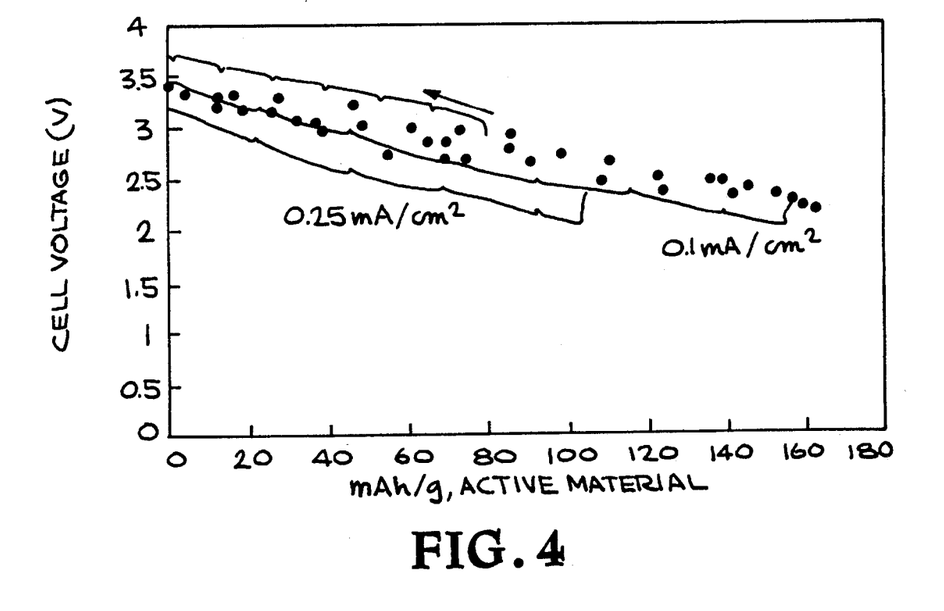
FIG. 4 is a graph showing the cell voltage plotted against discharge capacity for a secondary cell with an orthorhombic sodium manganese oxide active cathode material and a sodium anode.

FIG. 4 shows the plotted data of FIG. 3 superimposed on a graph which shows the cell voltages plotted against the capacity at various point along the discharge, expressed in milliampere hours per gram (mAh/g), for several rates of charge/discharge performed at 85° C. on the cells of Example I. The FIG. 3 data is superimposed between zero discharge, representing full charge of the cell, to 160 mAh/g representing full discharge of the cell. It will noted that the slope of the charge/discharge for the 0.25 mA/cm² rate is about the same as the slope of the charge/discharge for the 0.1 mA/cm² rate.

Figure 5:
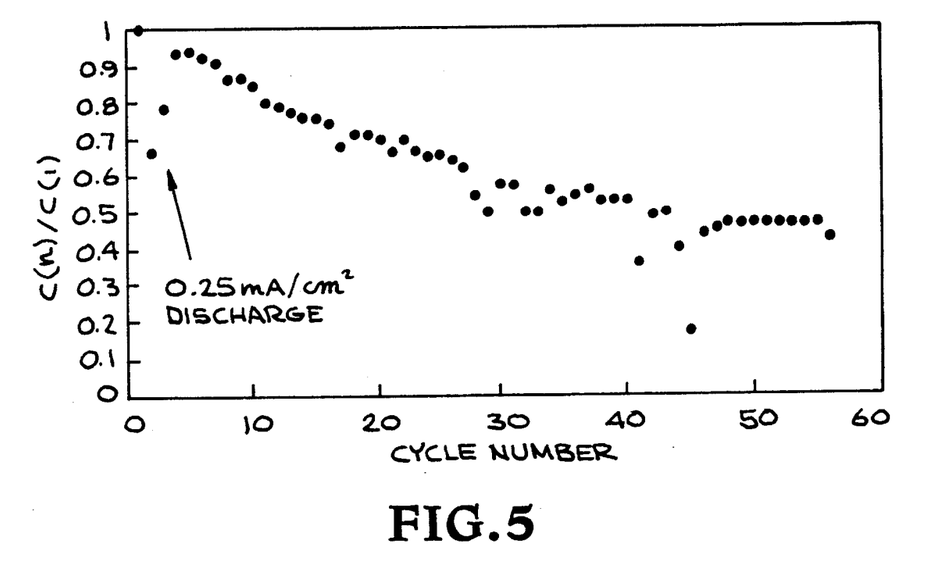
FIG. 5 is a graph showing the ratio of actual discharge capacity versus theoretical capacity plotted against number of charge/discharge cycles for a secondary cell with an orthorhombic sodium manganese oxide active cathode material and a sodium anode.

One of the cells of Example I (in which the sodium in the active cathode material was not initially leached out) was cycled 60 times at a 0.1 mA/cm² rate (except for the point noted as 0.25 mA/cm²) at 85° C. with the total capacity determined as a % of theoretical capacity. The results are plotted in FIG. 5. While there is an initial drop in the ratio of actual capacity versus theoretical capacity, it can be seen that this ratio stabilizes between 20–30 cycles and does not thereafter drop appreciably.

EXAMPLE II

A further set of cells were constructed similar to those of the second set of cells in Example I, except that in addition to removal of the sodium by acid leaching in the orthorhombic sodium manganese oxide structure, a lithium anode was used, and lithium bistrifluoromethane sulfonate imide (TFSI) salt was used in both the separator and in the electrolyte in the composite cathode, i.e., lithium/lithium manganese oxide cells were constructed.

Figure 6:
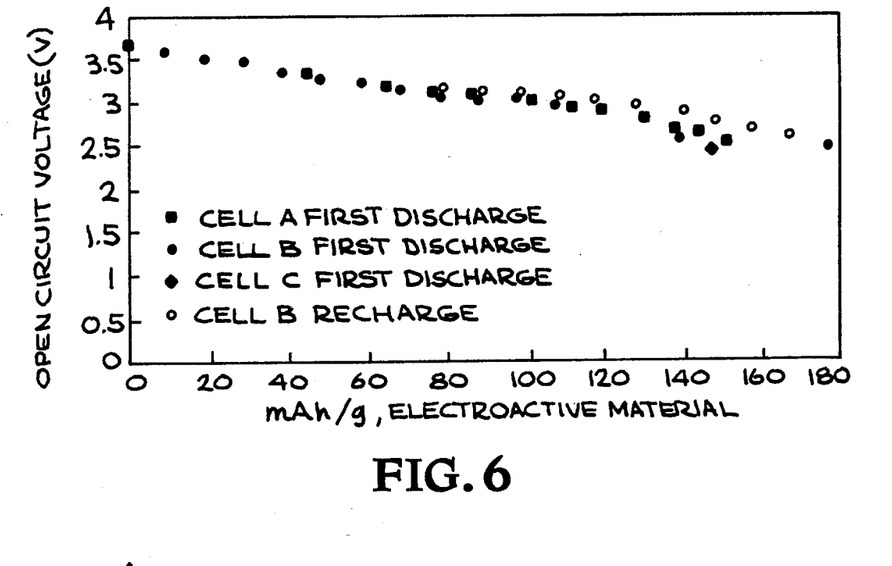
FIG. 6 is a graph showing open circuit voltages, at various states of charge for a secondary cell with a lithiated orthorhombic sodium manganese oxide active cathode material and a lithium anode.

The open circuit voltage from complete charge to complete discharge for several of these cells was determined in a manner similar to that of Example I, except at 105° C. FIG. 6 plots the charge/discharge characteristics of several of these cells by plotting open circuit voltage versus the amount of discharge in mAh/g. As in the sodium cells, it can be seen that the charge/discharge slopes of the cells is linear, again indicating no phase change, with the test cells a–c showing reproducible characteristics.

Figure 7:
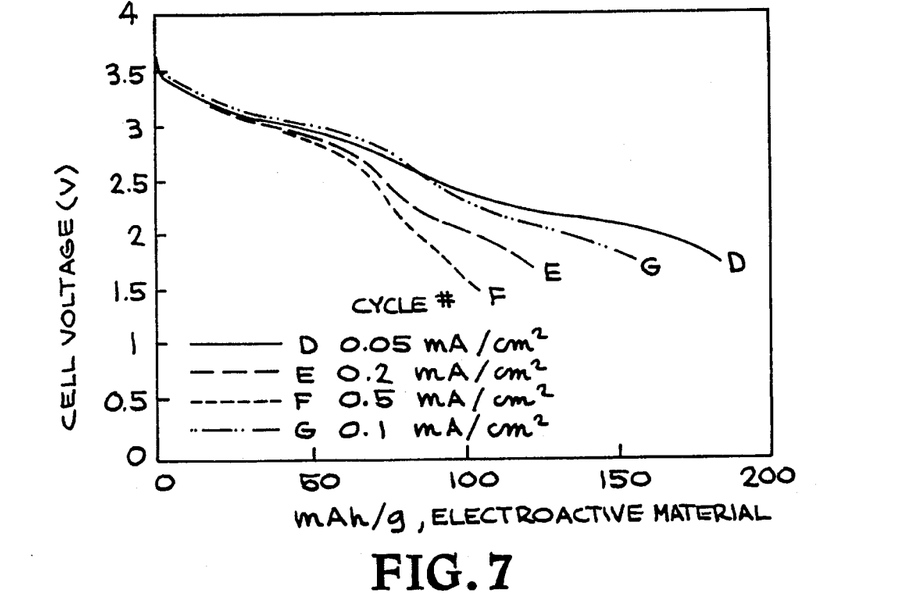
FIG. 7 is a graph showing total discharge capacity at various discharge rates for a secondary cell with a lithiated orthorhombic sodium manganese oxide active cathode material and a lithium anode.

Several of the above described lithium cells, labelled d–g in FIG. 7, were then discharged at various discharge rates at 105° C., with the cell voltage then plotted against the discharged capacity of the cell for each rate. The results show that even at high rates of discharge, a considerable amount of capacity can be discharged.

Figure 8:
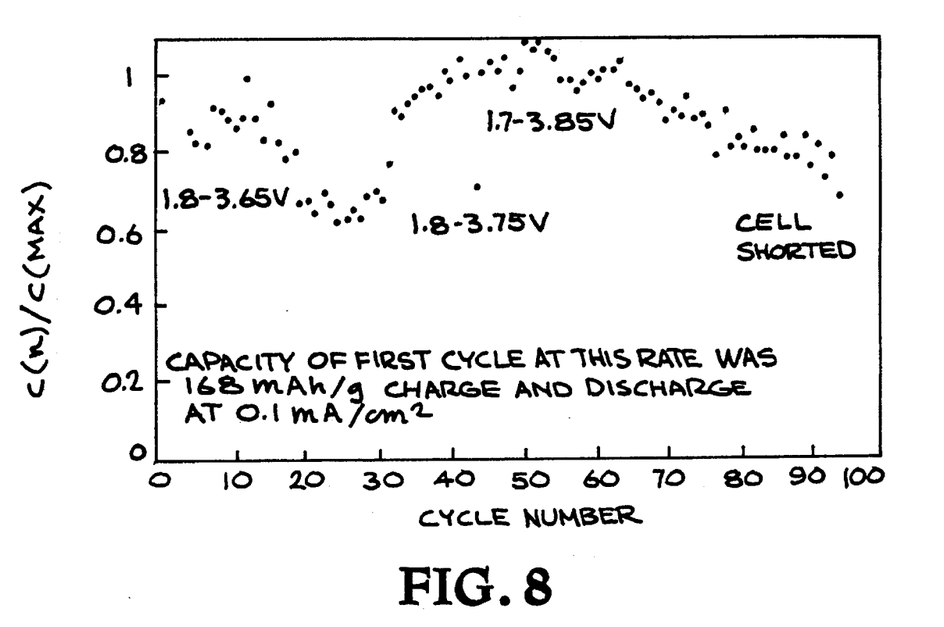
FIG. 8 is a graph showing the ratio of actual capacity to theoretical capacity over a number of charge/discharge cycles for a secondary cell with a lithiated orthorhombic sodium manganese oxide active cathode material and a lithium anode.

Another of the above described lithium cells was cycled between full charge and full discharge for over 90 times, at a 0.1 mA/cm² rate, with the ratio of actual amount of energy discharged to theoretical amount of energy noted (the actual capacity of the first cycle for this cell at this rate was 168 mAh/g). The results are plotted in FIG. 8. It should be noted that the results shown in FIG. 8 show a change in the fully charged voltage limit being made after the 30th cycle and both the fully charged and fully discharged voltage limits being further extended at about cycle 45, with this extension at cycle 45 probably leading to both an overcharged state and over discharge, which may have accelerated the final failure of the cell at just over 90 cycles. However, it is believed that the plotted results in FIG. 8 will indicate to those skilled in the art that the actual charge capacity, as a percentage of theoretical capacity, would remain substantially linear throughout the 90 cycles if the charge/discharge voltage limits had remained between 1.8–3.75 volts.

Similar results to those described above for the lithium cells of Example II can be obtained when the sodium is initially removed from the orthorhombic sodium manganese oxide structure and replaced by lithium using ion exchange, rather than by acid leaching.

EXAMPLE III

Figure 9:
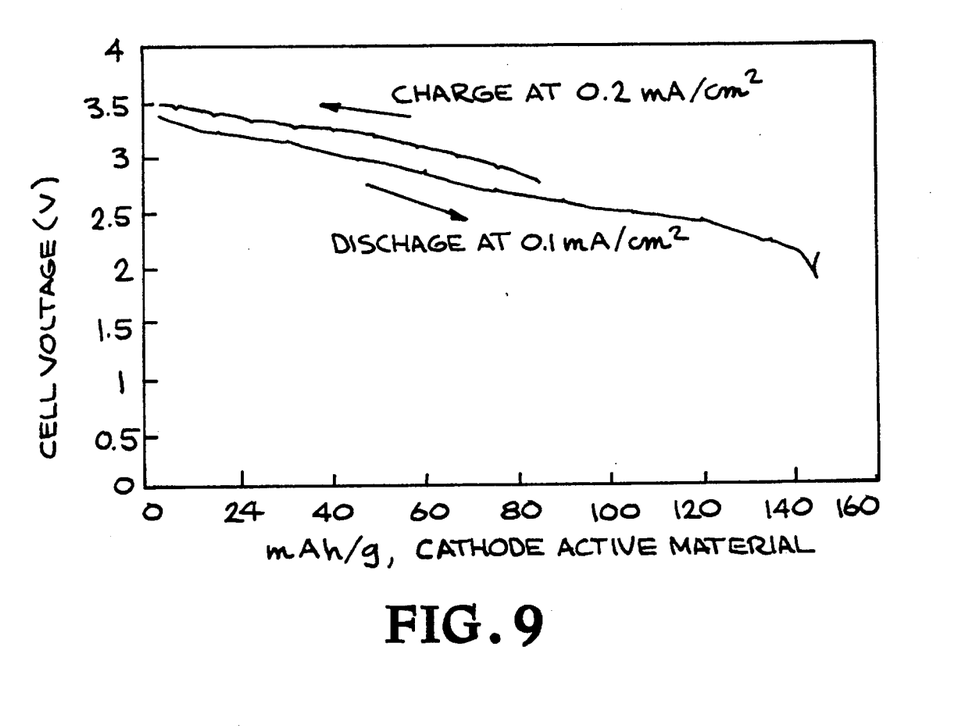
FIG. 9 is a graph plotting cell voltage versus total discharge capacity for a secondary cell with an orthorhombic sodium manganese oxide active cathode material doped with iron, and a sodium anode.

To show the advantages of doping of the orthorhombic sodium manganese oxide active cathode material to replace a portion of the manganese with another metal capable of replacing the manganese atoms in the same crystal structure, cells similar to the first set of cells described in Example I were constructed, except that during the formation of the active cathode material a portion of the manganese was replaced by iron, resulting in an orthorhombic structure having the following as made stoichiometry: $Na_{0.44}Fe_{0.2}Mn_{0.98}O_2$. Charging of these cells at a rate of 0.2 mA/cm² followed by discharge at a rate of 0.1 mA/cm², at 85° C. is shown in the graph of FIG. 9, indicating similar charge/discharge characteristics despite the difference in the rates.

Figure 10:
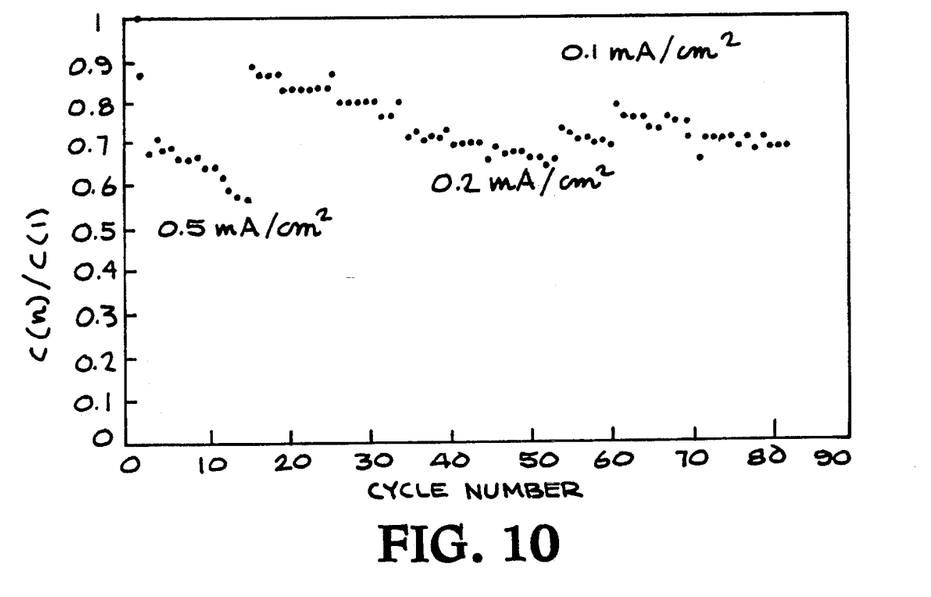
FIG. 10 is a graph showing the ratio of actual capacity to theoretical capacity over a number of charge/discharge cycles, and for several discharge rates for a secondary cell with an orthorhombic sodium manganese oxide active cathode material doped with iron, and a sodium anode.

To further test the capability of the iron-doped cells to deliver similar amounts of charge at different rates of discharge over an extended number of cycles, a cell was discharged, at 85° C., first at a slow rate of 0.1 mA/cm², then at 0.2 mA/cm², and then for a number of times at a rate of 0.5 mA/cm², up to about 18 cycles. The rate was then reduced to 0.2 mA/cm² until about 55 cycles, at which time the rate was further reduced to 0.1 mA/cm². The results are plotted in FIG. 10, which shows a high ratio of actual capacity to theoretical capacity even after 80 cycles.

Figure 11:
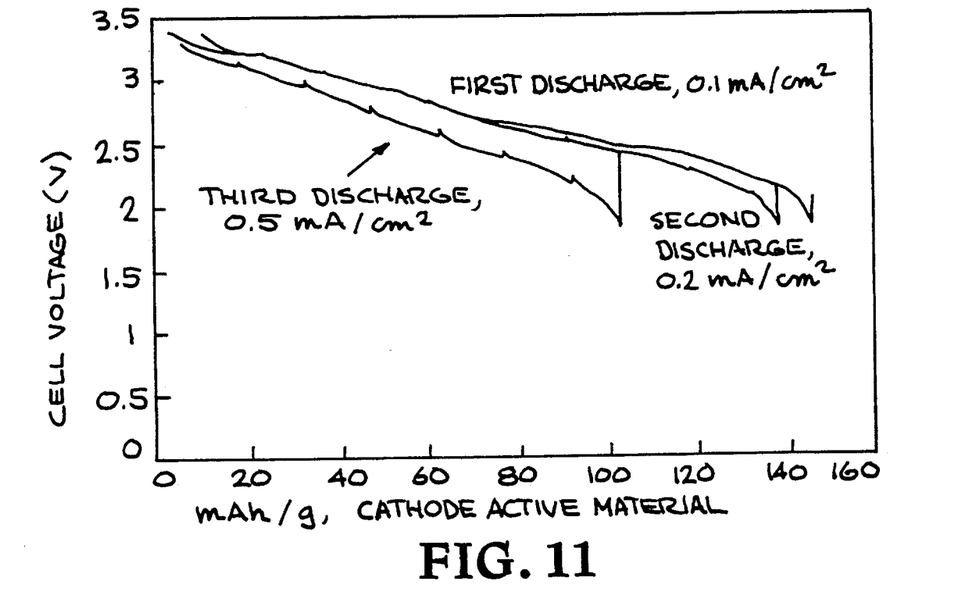
FIG. 11 is a graph plotting cell voltage versus total discharge capacity at several discharge rates for a secondary cell with an orthorhombic sodium manganese oxide active cathode material doped with iron, and a sodium anode.

Another iron-doped cell was the, n discharged at various rates, at 85° C., with the discharged energy of the cell (in mAh/g) plotted against cell voltage for each discharge rate. The results are shown in FIG. 11. It will be noted that the plot of the 0.1 mA/cm² rate is almost identical to the plot of the 0.2 mA/cm² rate, while the 0.5 mA/cm² rate is also very similar to the lower discharge rates, indicating that the doping renders the cell less sensitive to changes in the rate of discharge. In this respect, comparison is invited between the differences between the plotted 0.1 and 0.5 mA/cm² rates shown in FIG. 11 and the 0.1 and 0.25 mA/cm² rates shown in FIG. 4, representing the undoped sodium/sodium manganese oxide cell. It will be noted that there is at least as large a change in the characteristics shown in the rates plotted in FIG. 4 as the differences in FIG. 11, despite the fact that FIG. 11 is plotting discharge rates of 0.1 versus 0.5 mA/cm², i.e., a 5 fold difference, while FIG. 4 is plotting discharge rates of 0.1 versus 0.25 mA/cm² rate, i.e., only a 2½ fold difference.

Thus, the secondary cell of the invention, having an orthorhombic alkali metal manganese oxide active cathode material, exhibits a linear charge/discharge capacity without phase change, a high rate of discharge, good cycling capabilities, good stability of the cathode material, high specific energy and high energy density.

Having thus described the invention what is claimed is:

1. An alkali manganese oxide secondary cell characterized by the presence of orthorhombic alkali metal manganese oxide in the active cathode material comprising:
   a) an anode; and
   b) an orthorhombic active cathodic material, initially formed as orthorhombic $Na_{0.44}Z_yMn_{(1-y)}O_2$, said orthorhombic cathodic material having the formula $M_xZ_yMn_{(1-y)}O_2$, where M is one or more alkali metals selected from the group consisting of lithium, sodium, potassium, and mixtures of same, x ranges from 0.2 to 0.75, depending upon the state of charge of the cathode, Z is a metal capable of substituting for manganese in the orthorhombic structure, and y is 0 to 60 atomic %.

2. The alkali manganese, oxide secondary cell of claim 1 wherein said cell further includes a solid electrolyte.

3. The alkali manganese oxide secondary cell of claim 1 wherein said cell further includes a liquid electrolyte.

4. The alkali manganese oxide secondary cell of claim 2 wherein said solid electrolyte comprises an ionically conductive polymer and an alkali metal salt.

5. The alkali manganese oxide secondary cell of claim 2 wherein said solid electrolyte comprises an ionically conductive polymer, an alkali metal salt, and a plasticizer.

6. The alkali manganese oxide secondary cell of claim 2 wherein said solid electrolyte and said orthorhombic active cathode material comprise a composite cathode.

7. The alkali manganese oxide secondary cell of claim 6 wherein said composite cathode also contains carbon.

8. The alkali manganese oxide secondary cell of claim 7 wherein said composite cathode also contains a dispersant to inhibit aggregation of said orthorhombic active cathode material and said carbon in said composite cathode.

9. The alkali manganese oxide secondary cell of claim 2 wherein said anode is selected from the group consisting of an alkali metal, carbon, and a carbon-containing material.

10. The alkali manganese oxide secondary cell of claim 2 wherein said anode is selected from the group consisting of lithium, sodium, and potassium.

11. The alkali manganese oxide secondary cell of claim 2 wherein said Z in said formula for said orthorhombic active cathode material is selected from the group consisting of Group IVB metals, Group VB metals, Group VIB metals, Group VIIB metals, and Group VIII metals.

12. The alkali manganese oxide secondary cell of claim 2 wherein said Z in said formula for said orthorhombic active cathode material is selected from the group consisting of titanium, zirconium, hafnium, vanadium, niobium, tantalum, chromium, molybdenum, tungsten, technetium, rhenium, iron, cobalt, nickel, ruthenium, rhodium, palladium, osmium, iridium, and platinum.

13. The alkali manganese, oxide secondary cell of claim 6 wherein said composite cathode further comprises an ionically conductive polymer and an alkali metal salt.

14. The alkali manganese oxide secondary cell of claim 1 wherein x is 0.44±0.02 in the as made state.

15. An alkali manganese oxide secondary cell characterized by the presence of orthorhombic alkali metal manganese oxide in the active cathode material comprising:
a) an anode selected from the group consisting of an alkali metal, an alkali metal alloy, carbon, and a carbon-containing material; and
b) an orthorhombic active cathodic material, initially formed as orthorhombic $Na_{0.44}Z_yMn_{(1-y)}O_2$, said orthorhombic cathodic material having the formula $M_xZ_yMn_{(1-y)}O_2$, where M is one or more alkali metals selected from the group consisting of lithium, sodium, and mixture of same, x ranges from 0.2 to 0.75, depending upon the state of charge of the cathode, Z is a metal capable of substituting for manganese in the orthorhombic structure, and y is 0 to 60 atomic %.

16. The alkali manganese oxide secondary cell of claim 15 wherein said cell further includes a solid electrolyte.

17. The alkali manganese oxide secondary cell of claim 16 wherein said solid electrolyte comprises an ionically conductive polymer and an alkali metal salt.

18. The alkali manganese oxide secondary cell of claim 16 wherein said solid electrolyte and said orthorhombic active cathode material comprise a composite cathode.

19. The alkali manganese oxide secondary cell of claim 17 wherein said solid electrolyte and said orthorhombic active cathode material comprise a composite cathode, which also contain carbon.

20. The alkali manganese oxide secondary cell of claim 19 wherein said composite comprises:
a) said solid electrolyte;
b) said orthorhombic active cathode material;
c) carbon; and
d) a dispersant to prevent said carbon and said orthorhombic active cathode material from agglomerating.

21. An alkali manganese oxide secondary cell characterized by the presence of orthorhombic alkali metal manganese oxide in the active cathode material comprising:
a) an anode; and
b) an orthorhombic active cathodic material, initially formed as orthorhombic $Na_{0.44}MnO_2$, said orthorhombic cathodic material having the formula $M_xMnO_2$, where M is one or more alkali metals selected from the group consisting of lithium, sodium, potassium, and mixtures of same, and x ranges from about 0.2 in the fully charged states to about 0.75 in the fully discharged state.

22. The alkali manganese oxide secondary cell of claim 21 wherein said cell further comprises a solid electrolyte.

23. The alkali manganese oxide secondary cell of claim 22 wherein said solid electrolyte comprises an ionically conductive polymer and an alkali metal salt.

24. The alkali manganese oxide, secondary cell of claim 22 wherein said solid electrolyte and said orthorhombic active cathode material comprise a composite cathode.

25. The alkali manganese oxide secondary cell of claim 24 wherein said composite comprises:
a) said solid electrolyte;
b) said orthorhombic active cathode material;
c) carbon; and
d) a dispersant to prevent said carbon and said orthorhombic active cathode material from agglomerating.

26. The alkali manganese oxide secondary cell of claim 22 wherein said anode is selected from the group consisting of an alkali metal, carbon, and a carbon-containing material.

27. The alkali manganese oxide secondary cell of claim 22 wherein said anode is selected from the group consisting of lithium, sodium, and potassium.

28. An alkali manganese oxide secondary cell characterized by the presence of orthorhombic alkali metal manganese oxide in the active cathode material comprising:
a) an anode selected from the group consisting of an alkali metal, an alkali metal alloy, carbon, and a carbon-containing material;
b) an ionically conductive solid separator; and
c) a composite cathode comprising:
  i) an orthorhombic active cathodic material, initially formed as orthorhombic $Na_{0.44}MnO_2$, said orthorhombic cathodic material having the formula $M_xMnO_2$, where M is one or more alkali metals selected from the group consisting of lithium, sodium, potassium, and mixtures of same, and x ranges from about 0.2 in the fully charged state to about 0.75 in the fully discharged state; and
  ii) a solid electrolyte comprising;
    1) an ionically conductive polymeric material;
    2) an alkali metal salt;
    3) carbon; and
    4) a dispersant.

29. The alkali manganese oxide secondary cell of claim 28 wherein said anode is selected from the group consisting of lithium, sodium, and potassium.

30. A sodium manganese oxide secondary cell characterized by the presence of orthorhombic sodium manganese oxide in the active cathode material comprising:
a) an anode;
b) an ionically conductive solid separator;
c) an electrolyte; and
d) an orthorhombic active cathodic material, initially formed as orthorhombic $Na_{0.44}MnO_2$.

31. A lithium manganese oxide secondary cell characterized by the presence of orthorhombic lithium manganese oxide in the active cathode material comprising:

a) an anode;
b) an ionically conductive solid separator;
c) an electrolyte; and
d) an orthorhombic active cathodic material, initially formed as orthorhombic $Na_{0.44}MnO_2$ and then at least partially converted to said orthorhombic lithium manganese oxide by replacing at least a portion of said sodium with lithium without, however, disrupting the orthorhombic structure.

* * * * *